US009406018B2

(12) United States Patent (10) Patent No.: US 9,406,018 B2
Upadhyaya et al. (45) Date of Patent: Aug. 2, 2016

(54) SYSTEMS AND METHODS FOR SEMANTIC DATA INTEGRATION

(75) Inventors: Sujatha Raviprasad Upadhyaya, Bangalore (IN); Radha Krishna Pisipati, Hyderabad (IN)

(73) Assignee: Infosys Limited, Bangalore (IN)

(*) Notice: Subject to any disclaimer, the term of this patent is extended or adjusted under 35 U.S.C. 154(b) by 251 days.

(21) Appl. No.: 13/531,117

(22) Filed: Jun. 22, 2012

(65) Prior Publication Data

US 2013/0198117 A1 Aug. 1, 2013

(30) Foreign Application Priority Data

Jan. 31, 2012 (IN) .............................. 359/CHE/2012

(51) Int. Cl.
*G06F 15/18* (2006.01)
*G06N 5/02* (2006.01)
*G06K 9/62* (2006.01)
*G06N 99/00* (2010.01)
*G06N 7/00* (2006.01)

(52) U.S. Cl.
CPC ................ *G06N 5/02* (2013.01); *G06K 9/6256* (2013.01); *G06K 9/6269* (2013.01); *G06N 5/025* (2013.01); *G06N 7/005* (2013.01); *G06N 99/005* (2013.01)

(58) Field of Classification Search
None
See application file for complete search history.

(56) References Cited

U.S. PATENT DOCUMENTS

| 7,739,218 | B2* | 6/2010 | Arguello et al. ................. 706/61 |
| 8,433,715 | B1* | 4/2013 | Mirhaji .......................... 707/756 |
| 8,775,226 | B2* | 7/2014 | Oberhofer et al. ............ 705/7.11 |
| 2003/0172368 | A1* | 9/2003 | Alumbaugh et al. .......... 717/106 |
| 2005/0243604 | A1* | 11/2005 | Harken et al. ............ 365/185.22 |
| 2010/0324927 | A1* | 12/2010 | Tinsley .............................. 705/2 |
| 2012/0191716 | A1* | 7/2012 | Omoigui ........................ 707/740 |
| 2014/0074826 | A1* | 3/2014 | Cooper et al. ................. 707/722 |

* cited by examiner

*Primary Examiner* — Kakali Chaki
*Assistant Examiner* — Ababacar Seck
(74) *Attorney, Agent, or Firm* — LeClairRyan, a Professional Corporation (57) ABSTRACT

Embodiments of the present invention relate to a system for data integration and information retrieval by bringing semantically related data together for a given context. As described, the integration of data may include the building of an ontology, the mapping of one or more processes, semantic maps and concept dictionaries in the ontology to one or more data sources, tagging the data sources in accordance with the ontology, providing a query interface for accepting an input query from a user, the mapping of the input query to one or more concepts in the ontology, and deriving one or more subqueries thereby, and the querying of data sources in accordance with the composed one or more subqueries, wherein the data sources queried are tagged with one or more concepts from the ontology. Additionally, the tracking of data across data sources in accordance with a defined data value chain is disclosed.

42 Claims, 5 Drawing Sheets

SYSTEMS AND METHODS FOR SEMANTIC DATA INTEGRATION

This application claims the benefit of Indian Patent Application Filing No. 359/CHE/2012, filed Jan. 31, 2012, which is hereby incorporated by reference in its entirety.

FIELD

The invention relates generally to the integration of data across different data sources. In particular, the invention relates to a system for data integration and information retrieval by bringing semantically related data together for a given context.

BACKGROUND

Extant data integration processes generally require that data sources are specified explicitly for a particular task. In other words, integration rules defined over multiple sources may be pre-defined and static. Updating these rules may take a significant amount of re-development or re-processing time. An additional focus of extant techniques for data integration is on identifying and ensuring the unique identity of data across data sources. As a consequence, a holistic view of the data is difficult to get, as each data source is treated as an individual entity rather than as an entity related to other entities in the set.

In defining static rules for dealing with data, existing technologies may lack context based understanding, and, as a consequence, fail to recognize semantically related data during integration. Lacking an ability to resolve the semantic relevance of associated data, existing data integration and value upgrade tasks may not be truly complete, as they may fail to bring together related data sources. An additional consequence may include an inability to organize data in such a way that retrieved information is confined to a particular theme that is related to an input query.

In the absence of semantic relationships between data, tracing the movement of data across a data value chain may constitute an enormous effort without a record of which version of data evolved from which other version.

Accordingly, there is a need for a system and method for data integration that is able to bring semantically related data together for a given context.

SUMMARY

The present invention addresses the foregoing need by providing systems and methods for the semantic integration of data.

In accordance with the invention, in a first embodiment, a system for the integration of data is described, the system comprising a processor in operable communication with a processor readable storage medium, the processor readable storage medium containing one or more programming instructions whereby the processor is configured to implement a semantic data integrator. The semantic data integrator may comprise an ontology repository containing an ontology, wherein the ontology comprises at least one ontology level and at least one concept in an ontology level. The semantic data integrator may additionally comprise a query interface module in communication with the ontology repository, wherein the query interface module is configured to receive an input command.

The semantic data integrator module may further be in operable communication with the ontology repository and the query interface module, wherein the semantic data integrator module is configured to receive one or more input commands from the query interface and map the input command to one or more concepts in the ontology repository.

Mapped commands may further be composed into one or more subcommands from the input command. One or more data sources may be queried in accordance with the composed one or more data queries, wherein the one or more data sources queried are tagged with one or more concepts from the ontology repository. The system described may additionally comprise one or more persistent data sources stored on at least one database, wherein the data sources are communicably connected to the data integration layer, and tagged with at least one concept from the ontology repository.

In accordance with the invention, in a second embodiment, a computer aided method for the integration of semantically related data is described, the method comprising building an ontology, the ontology comprising one or more concept dictionaries and semantic maps. As described, the embodiment may additionally include inserting the ontology into an ontology repository, wherein the ontology repository is stored on a processor readable storage medium; specifying one or more process ontologies, and inserting the one or more process ontologies so specified into the ontology. The embodiment may additionally include a computer implemented act of mapping the one or more processes, semantic maps and concept dictionaries to one or more data sources. As described, the mapping may additionally comprise tagging the at least one data source in accordance with the one or more process ontologies, concept dictionaries, or semantic maps specified, a computer implemented act of providing a query interface for accepting an input query from a user, wherein the query interface is communicably coupled to the ontology repository, a computer implemented act of mapping the input query to one or more concepts in the ontology, and deriving one or more data queries thereby, and a computer implemented act of querying the one or more data sources in accordance with the composed one or more data queries, wherein the one or more data sources queried are tagged with one or more concepts from the ontology.

In accordance with the invention, in a third embodiment, a non-transitory computer readable storage medium having stored thereon computer executable instructions for performing a method of optimizing the performance of one or more software components at runtime is described, the method comprising building an ontology comprising concept dictionaries and semantic maps and inserting the ontology into an ontology repository, wherein the ontology repository is stored on a processor readable storage medium. The method so executed may additionally insert one or more process ontologies into the ontology, map the one or more process ontologies, semantic maps and concept dictionaries to one or more data sources, wherein the one or more data sources are stored in one or more processor readable storage media. Such mapping may comprise tagging the at least one data source in accordance with the one or more process ontologies, concept dictionaries, or semantic maps specified, providing a command interface for accepting an input query or an input command from a user, wherein the command interface is communicably coupled to the ontology repository, mapping the input query to one or more concepts in the ontology repository, and deriving one or more data commands thereby, and querying the one or more data sources in accordance with the composed one or more data queries, wherein the one or more data sources queried are tagged with one or more concepts from the ontology repository. The method may additionally comprise consolidating data received from one or more data sources in response to the query passed to each of the data sources, organizing the consolidated data in accordance with one or more concepts relevant to the input query received, and presenting the unified, semantically integrated data through an output interface.

BRIEF DESCRIPTION OF THE DRAWINGS

These and other features, aspects, and advantages of the present invention will be better understood when the following detailed description is read with reference to the accompanying drawings in which like characters represent like parts throughout the drawings, wherein.

While systems and methods are described herein by way of example and embodiments, those skilled in the art recognize that systems and methods for semantic data integration are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

The following description is the full and informative description of the best method and system presently contemplated for carrying out the present invention which is known to the inventors at the time of filing the patent application.

The present invention relates to systems and methods for the integration of data.

Organizations, particularly large scale organizations such as business and government, tend to generate a large, and increasing, volume of data. Data generated, in this context, is characterized as either persistent, or dynamic. Dynamic data may generally be characterized as data that is generated within a recent or predetermined time period. Persistent data may be data that has been archived for longer than the predetermined time period. For example, in a large scale retail outlet, sales and footfall figures from the start of a day's business until a period prior to close may constitute dynamic data. In contrast, sales and footfall data over the period spanning the month previous to that day may constitute persistent data. In general, organizations may derive significant value from the extraction of information from persistent data. In large part, the additional value derived from persistent data may be a result of that data's value enhancement as it progresses through an organizations data lifecycle.

A characteristic aspect of the data lifecycle, then, is the data value chain. The data value chain charts data sources as they 'move' or progress through a process, or set of processes, for data value enhancement. Movement in the data value chain is thus positively correlated with data quality. Processes involved in the data value chain may involve data origin and movement tracking processes as well as data cleanup processes, such as the removal of redundancies in a set of data. The relevancy of information retrieved in response to a user input query may be directly correlated with the quality of the organization's data value chain.

The efficient extraction of such information has consequently become a significant challenge that requires robust methods for data integration and management that remain extensible. Efficient methods for data integration that address this need may also advantageously incorporate a global view of an organizations persistent data, as well as present said data in a semantically integrated data view.

Integrating semantically related data may additionally allow the organization to identify and derive an 'Information Good', i.e. a set of related information that provides actionable insight that is of value to the organization. For example, as in the aforementioned retail chain, a set of information that constitutes a response to a natural language query such as 'which products are/were well received?' may constitute an information good.

In accordance with some described embodiments, a data integrator that integrates semantically related data relevant to a provided query or command may incorporate one or more ontologies upon which such semantic integration is predicated. A multi-level ontology may include data relevant to one or more data sources owned by the implementing organization. A multi-level ontology that forms the support for a semantic data integration framework may desirably be cognizant of contexts in which data sources are generated and vocabularies used to describe the data. The ontology may additionally contain process ontologies that describe one or more processes oriented toward quality transformation. The ontology defined may additionally store changes that are made to data sources, and define one or more processes for tracking them. External sources of knowledge and domain ontologies may serve as input to the ontology. Additionally, ontologies derived by machine learning processes may evolve and change an existing ontology, with the data source annotations refreshed accordingly.

The delivery of an information good, as described, in response to a user input query may be additionally enhanced, as in some described embodiments, by data value chain optimization. Such enhancement may involve the integration of a semantic data integrator with an extant or a new data logistics service system, where the system is able to capture and model the movement of persistent data, facilitate processing of the persistent data to produce information goods and provide a semantically rich data representation and integration layer. Strengthening or enhancing the data value chain may additionally be accomplished by incorporating one or more process definitions into ontology, and running those processes on the data.

In accordance with some embodiments, disclosed implementations may include a multi-level data ontology architecture, components and sub-components of persistent data, trace a relationship between said components, as well as their properties, i.e. metadata, and define one or more processes for tracking movement along the data value chain and define the semantic relationship between said components.

Figure 1:
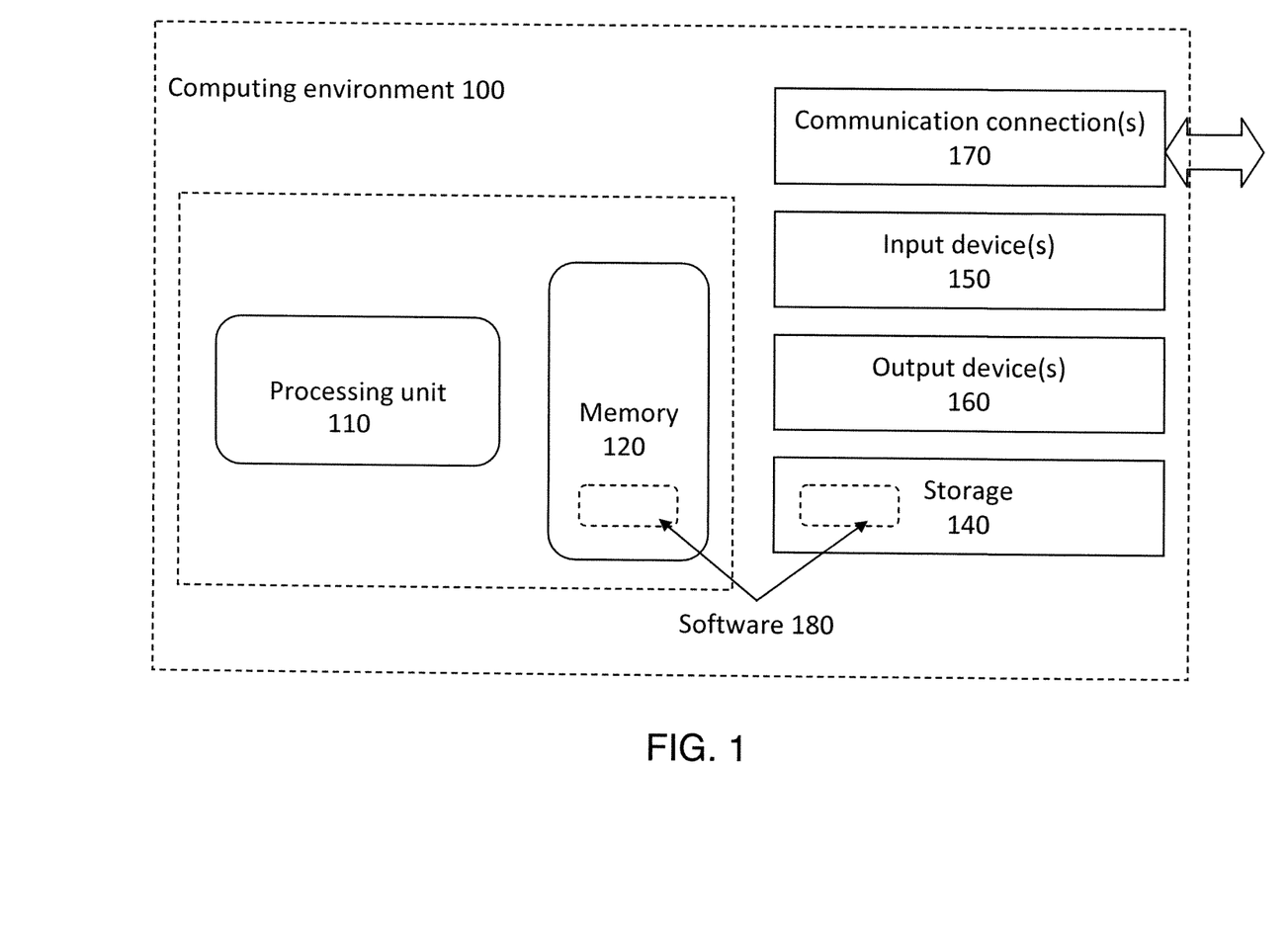
FIG. 1 is a diagram depicting a method for the integration of data, in accordance with a described embodiment of the present invention.

Referring now to FIG. 1, a computing environment 100 comprising a processing unit 110, a communication connection 170, an input device 150, an output device 160, and a processor readable storage medium 140, in operable communication with the processing unit 110, is depicted. The computing environment runs a software 180, the software 180 stored on the computer readable storage medium, and consisting of one or more programming instructions stored in the processor readable storage medium, the programming instructions suitable for the integration of data in accordance with one or more described embodiments.

Figure 3:
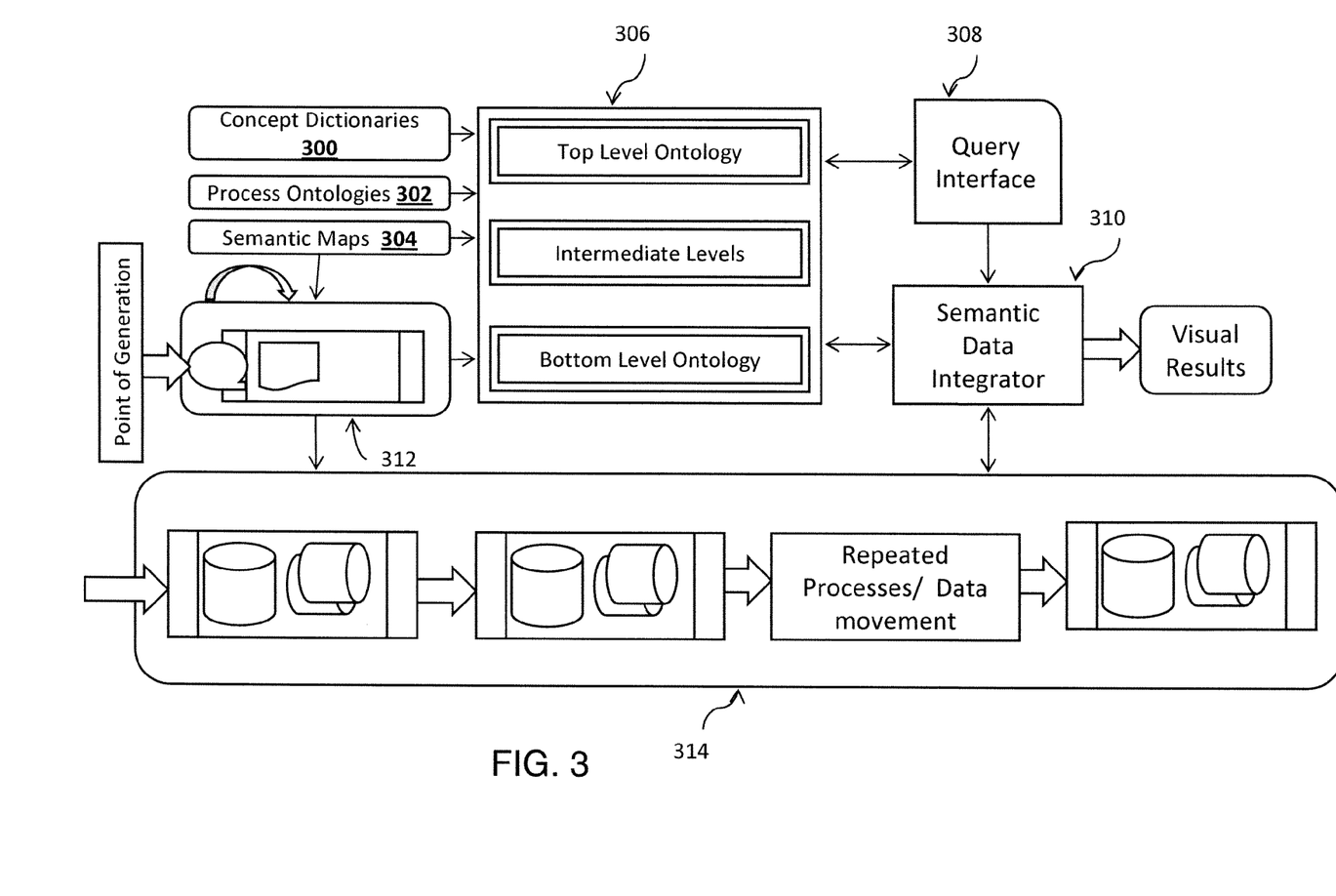
FIG. 3 is an illustrative schematic diagram of a system for the semantic integration of data, in accordance with a described embodiment of the present invention.

An implementation of the present invention is further described with reference to FIG. 3. FIG. 3 depicts, firstly, a multi-layered ontology as in 306 that may be stored, for example, in a processor readable storage medium. The multilayered ontology forms the semantic backbone of the implementation described. It may contain vocabularies and dictionaries 300, semantic mappings 302, and process ontologies 304 that may be used to annotate data sources. In some embodiments, the multi-level ontology may be indexed.

Developing the ontology may involve methods for collecting and collating knowledge from a variety of sources, including at least, for example, existing data or concept dictionaries within the organization, expert input, best practices in a relevant field, and process expertise. The collation of data may involve knowledge modeling methods including at least the use of Unified Modeling Language (UML) schema and the use of entity-relationship (ER) diagrams.

Data sources present are depicted by, firstly, 312. The data source 312 may accept data input, i.e., it may serve as a point of generation of data, as shown. Consequently, the data source 312 may be considered a dynamic data source, in accordance with some embodiments of the present invention. A dynamic data source may be, for example, data managed by a local database management system in a retail outlet that is subject to frequent updating.

Additional data sources are depicted by 314. One or more data sources, as in 314, may be subject to repeated processes including at user defined data filtration and data redundancy removal processes. Additional processes that act upon 314 may include tagging processes, whereby data elements are tagged with one or more concepts derived from the ontology 306. In accordance with some embodiments, tagging may include the insertion of metadata to a data element or data source, where the metadata inserted may describe components or sub-components of the data element or data source. The metadata may additionally describe or define a relationship between the components or sub-components of the data element or data source. Such a relationship may be defined in accordance with the ontology, 306. The metadata may additionally describe one or more properties of the components or sub-components of the data element or data source. For example, tags attached to a data source may indicate the origin of the data source, or the nature of the data contained in the data source, or the quality of the data source, or a thematic relationship of the data in the data source with other data.

The repeated processes that act upon the data sources 312 and 314 may be defined in the ontology, i.e. as one or more process ontologies. The one or more data sources 314 may be, as in some embodiments, persistent data sources. Persistent data sources, then, include those data sources that have been subject to one or more pre-defined processes, including at least a tagging process, whereby the persistent data sources may include metadata relating one or more components or sub-components across said data sources. Data stored in persistent data sources may be primarily directed toward data archival and retrieval, and stored, for example, non-locally.

For example, retail analytics data offloaded to a cloud based database may constitute persistent data. Additionally, dynamic data sources may be similarly subjected to one or more similar processes, and moved to persistent data over time.

Figure 4:
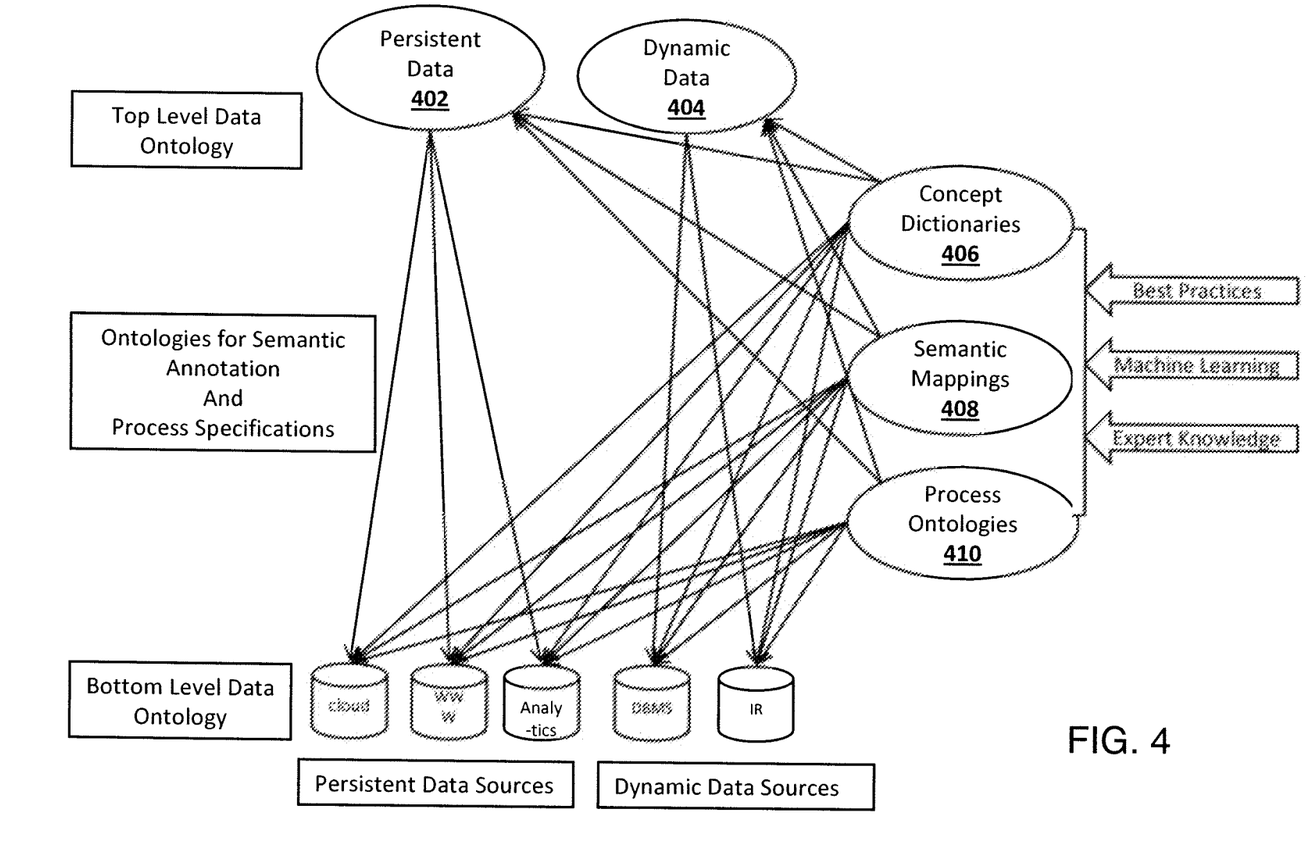
FIG. 4 is an illustrative diagram of a multi-level ontology for semantic data integration.

The interaction between the multi-level ontology and the data sources is further detailed with respect to FIG. 4. Inputs to the ontology elements 406, 408 and 410 may include the application of machine learning methods on existing data, or knowledge modeling methodologies that capture expert knowledge or best practices in a relevant field. In the example embodiment described, concepts captured in the ontology may be hierarchically ordered, where the top levels of the data ontology may contain semantic mappings relevant to the persistent data 402 and dynamic data 404. Successive levels may contain annotations and specifications for processes that operate upon the data sources. Concepts, stored as, for example, metadata, that are relevant to the individual data sources or data elements may be a part of the bottom levels of the data ontology.

In some embodiments, the ontology may additionally define one or more tracking processes that track data movement and quality or value upgrades within the data environment. In an example embodiment, a tracking process may include monitoring the annotations, or tags, associated with a particular data source or element. An increase or decrease in the annotations associated with said data source may indicate movement through the data value chain, i.e. well annotated data sources may be associated with relatively larger information content, leading to greater relevance in a query response. In some embodiments, tracking processes may include marking a data source for termination of the operation of one or more tagging processes on the data source.

Referring again to FIG. 3, the present implementation additionally comprises a semantic data integrator module 310 communicably coupled with a query interface 308. In accordance with some embodiments, the semantic data integrator may be configured to receive input commands from the query interface, map the input commands received to concepts in the multi-level ontology, and, where necessary, decompose said received commands into multiple sub-commands, or sub-queries, on the basis of said mapping, and query the data sources in accordance with the generated sub-queries.

In accordance with the present implementation, a query posed to the system may enriched by the domain specific ontologies in the multi layered ontology. The query interface, with the semantic data integrator, is configured to able to accept both queries and commands to the system and specifies particular tasks to be performed. Typical queries received that may be interpreted in conjunction with the multi-layered ontology may include queries to trace the data value chain, queries to trace quality or value upgrades, and queries to identify processes performed and indicate data transformation.

Typical tasks performed may include providing an integrated data view, performing data consolidation, and associated MDM (master data management) or CDI (customer data integration) tasks. Tasks to be performed may correspond to a task or process ontology in the multi-level ontology. When a new task is added, a respective definition in the ontology is added. The definition so added may specify a relationship between the task and all or some of the other concepts within of the multi layered ontology.

Query enrichment, i.e. composing one or more sub-queries on the basis of the input query or command, may be performed by consulting the existing multi-level ontology architecture. For example, in an implementation of a present embodiment deployed in a retail outlet, an initial query received from the query interface may be "Find all products that were well received". In this instance, "well received" may be translated into "successful" by the semantic data integrator by referencing an English language ontology present in the ontology architecture. Further, "Successful Product" may be translated into "Products that went out of stock in two days" or "Products that received more than 5 queries in a day" or "Products that sold more than 50 units a day". In this manner, the concept dictionaries and other domain ontologies may help in identifying, from context, different aspects that determine the "successfulness" of a product, and thereby aid in enriching the query posed.

The semantic data integrator may then identify data sources, and instances within the data sources, that are semantically relevant to the translated queries and retrieve them. Following retrieval, the received data may be presented in an integrated data view through an output interface coupled to the semantic data integrator 310. Following retrieval, changes in the data sources that have occurred in the course of processing the query are recorded, and appropriate tags are added, deleted or modified, where necessary.

Figure 5:
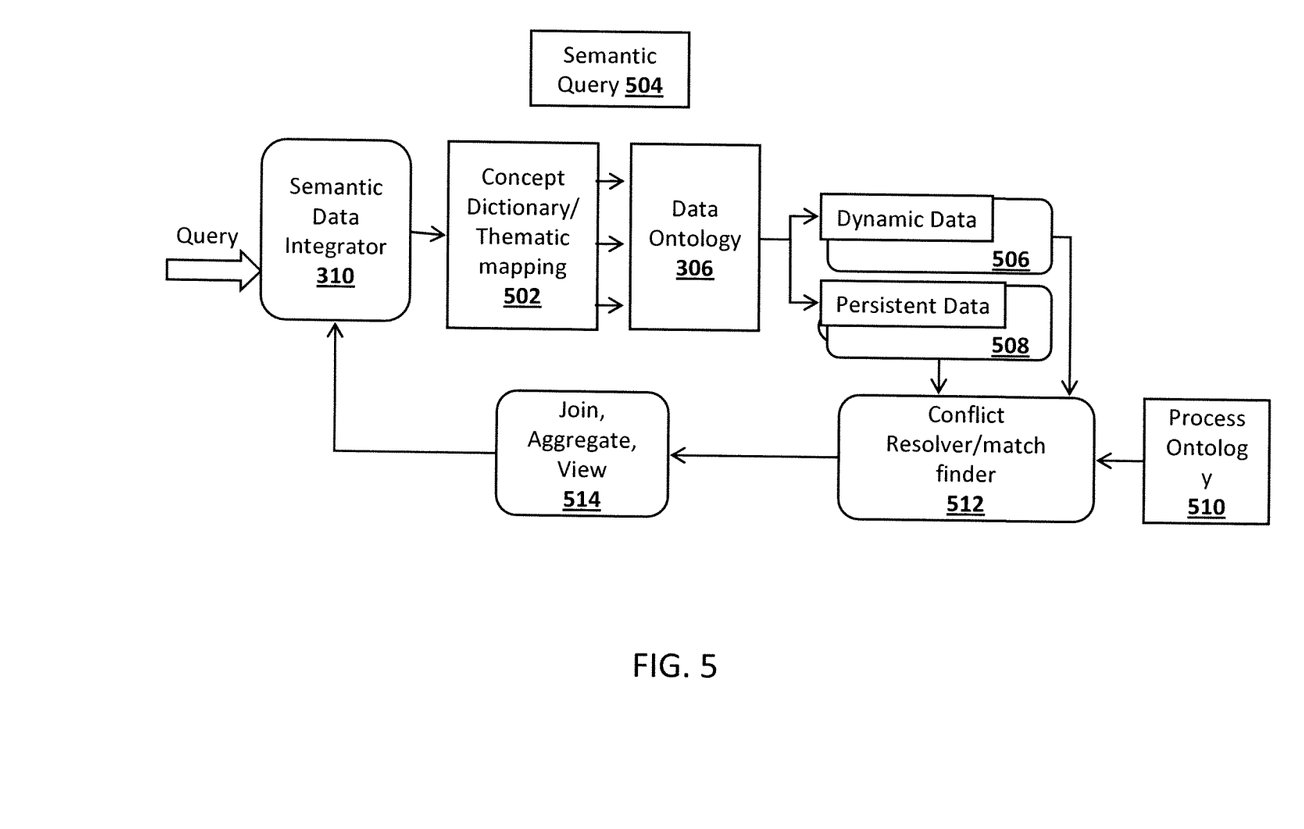
FIG. 5 is an illustrative diagram of a process for decomposing a query using a semantic data integrator, in accordance with a described embodiment of the present invention.

Query processing, in accordance with some embodiments, is further detailed in FIG. 5 where the semantic data integrator 310, on receiving a query, refers to the ontology 306, mapping the input query to ontology elements, as in 502. One or more semantic queries 504 are thus generated, and data retrieved from the dynamic data sources 506 and persistent data sources 508 accordingly. Where the retrieved data has one or more conflicts, including, for instance, duplication, those conflicts may be resolved by consulting one or more process ontologies 510 that are defined for conflict resolution. Process ontologies 510 may be a part of the ontology 306. Then, the clean data may be subject to one or more data operations 514, including, for instance, a JOIN operation. A consolidated data view thus obtained is then retrieved and output to the display interface by the semantic data integrator 310. Information thus presented may constitute an 'information good' associated with the user input query or command.

Figure 2:
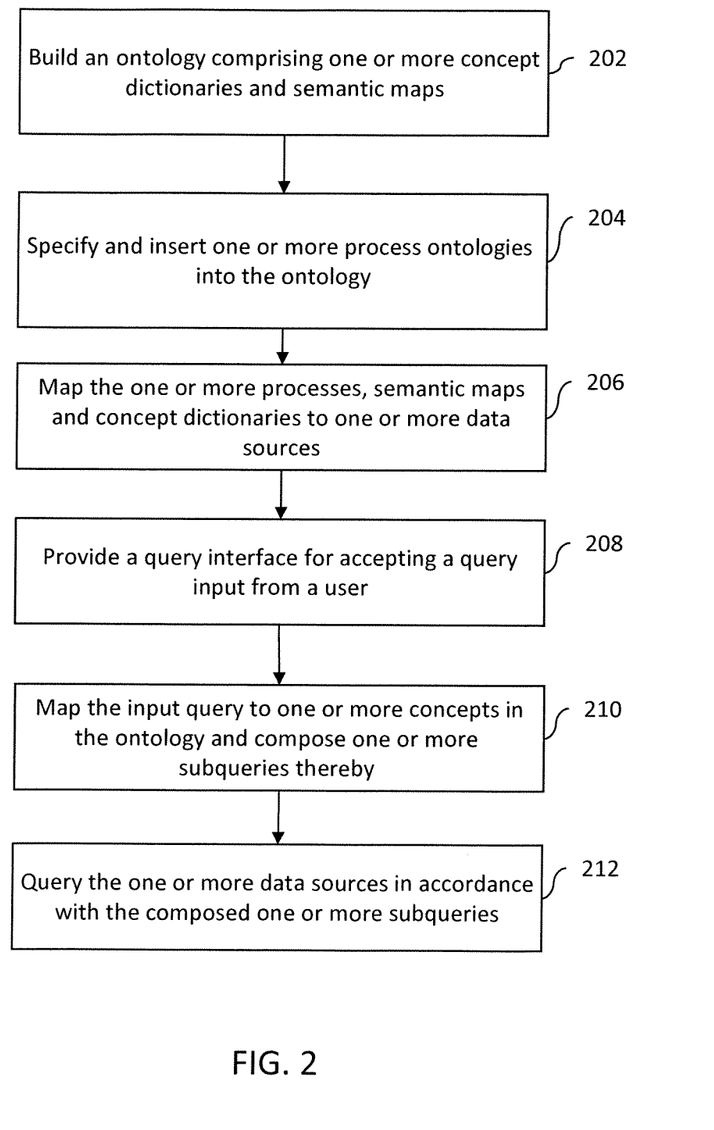
FIG. 2 is an illustrative diagram of a computing environment for the integration of data, in accordance with a described embodiment of the present invention.

Referring now to FIG. 2, the implementation of data integration in accordance with an additional embodiment of the invention includes, as in a step 202, building an ontology comprising one or more concept dictionaries and semantic maps. Further, as in a step 204, one or more process ontologies are specified and inserted into the ontology built in accordance with 202. Then, as in a step 206 of FIG. 2, the one or more process ontologies, semantic maps and concept dictionaries that together may comprise the multi-layered ontology are mapped to the one or more data sources present in the environment. Then, as in a step 208, a query interface for accepting a query input from a user is provided. A query or command may be received from the query interface. Queries may include, for example, requests for data relevant to user defined criteria. Commands may include, for example, a request to defragment data in the one or more data sources. Then, as in a step 210, the input query is mapped to one or more concepts in the ontology and one or more sub-queries are composed on the basis of the results of the mapping operation. Then, as in a step 212, the one or more data sources may, in turn, be queried in accordance with the composed sub-queries.

The present description includes the best presently-contemplated method for carrying out the present invention. Various modifications to the embodiments will be readily apparent to those skilled in the art and some features of the present invention may be used without the corresponding use of other features. Accordingly, the present invention is not intended to be limited to the embodiments shown but is to be accorded the widest scope consistent with the principles and features described herein.

As will be appreciated by those ordinary skilled in the art, the aforementioned example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code.

What is claimed is:

1. A semantic integration computing device, the device comprising:
    at least one processor;
    a memory coupled to the processor and configured to be capable of executing programmed instructions, which comprise the programmed instructions stored in the memory to:
        receive one or more input commands;
        create an ontology by mapping the one or more input commands to one or more concepts, wherein the created ontology comprises one or more ontology levels, the one or more ontology levels comprising the one or more concepts;
        compose one or more data queries based on the one or more input commands;
        query one or more data sources based on the composed one or more data queries, the queried one or more data sources comprising one or more persistent data sources and one or more dynamic data sources comprising one or more data elements;
        tag the one or more data elements in the queried one or more data sources with the one or more concepts, wherein the one or more data elements archived for a duration exceeding a predetermined time period are tagged as persistent data and the one or more data elements archived for a duration not exceeding the predetermined time period are tagged as dynamic data; and
        consolidate the tagged one or more data elements in accordance with the one or more concepts, wherein the one or more data elements tagged as persistent data are associated with the one or more persistent data sources and the one or more data elements tagged as dynamic data are associated with the one or more dynamic data sources.

2. The device as claimed in claim 1, wherein the ontology comprises at least one semantic map, a concept dictionary, or one or more process ontologies, wherein the at least one semantic map, the concept dictionary, or the one or more process ontologies comprise best practices, expert knowledge, or an application of machine learning technique on the one or more data sources.

3. The device as claimed in claim 2, wherein the one or more data elements comprises metadata describing the relationships between the one or more data elements.

4. The device as claimed in claim 2, wherein the processor is further configured to be capable of executing programmed instructions, which comprise the programmed instructions stored in the memory to:
resolve one or more conflicts between the one or more data elements by mapping the one or more data elements to the one or more process ontologies.

5. The device as claimed in claim 1, wherein the processor is further configured to be capable of executing programmed instructions, which comprise the programmed instructions stored in the memory to:
identify an information good in response to the one or more data queries, wherein an information good comprises a semantically related set of data elements.

6. The device as claimed in claim 1, wherein the created ontology comprises an index.

7. The device as claimed in claim 1, wherein the processor is further configured to be capable of executing programmed instructions, which comprise the programmed instructions stored in the memory to:
define, relationships between entities at different levels in the one or more ontology levels.

8. The device as claimed in claim 1, wherein the processor is further configured to be capable of executing programmed instructions, which comprise the programmed instructions stored in the memory to:
incorporate new standard ontologies into the created ontology to describe one or more data elements in the one or more data sources.

9. The device as claimed in claim 1, wherein the processor is further configured to be capable of executing programmed instructions, which comprise the programmed instructions stored in the memory to:
compose one or more sub-queries based on the one or more data queries.

10. The device as claimed in claim 1, wherein the processor is further configured to be capable of executing programmed instructions, which comprise the programmed instructions stored in the memory to:
organize the consolidated one or more data elements based on the one or more input commands.

11. The device as claimed in claim 1, wherein the one or more data sources comprises one or more dynamic data sources comprising one or more dynamic data elements generated after a pre-determined time period.

12. The device as claimed in claim 11, wherein the processor is further configured to be capable of executing programmed instructions, which comprise the programmed instructions stored in the memory to:
order the created ontology hierarchically, wherein the higher ontology levels comprise the one or more dynamic data elements.

13. The device as claimed in claim 1, wherein the processor is further configured to be capable of executing programmed instructions, which comprise the programmed instructions stored in the memory to:
track the origin and movement of the one or more data elements in the one or more data sources, wherein the tracked movement of the one or more data elements is a measure of a quantity of tags with which the one or more data sources is associated.

14. The device as claimed in claim 1, wherein the processor is further configured to be capable of executing programmed instructions, which comprise the programmed instructions stored in the memory to:
identify the one or more data sources that are semantically relevant to the one or more data queries; and
retrieve the one or more data elements from the identified one or more data sources.

15. A method for integration of semantically related data, the method comprising:
receiving, by the semantic integration computing device, one or more input commands;
creating, by the semantic integration computing device, an ontology by mapping the one or more input commands to one or more concepts, wherein the created ontology comprises one or more ontology levels, the one or more ontology levels comprising the one or more concepts;
composing, by the semantic integration computing device, one or more data queries based on the one or more input commands;
querying, by the semantic integration computing device, one or more data sources based on the composed one or more data queries, the queried one or more data sources comprising one or more persistent data sources and one or more dynamic data sources comprising one or more data elements;
tagging, by the semantic integration computing device, the one or more data elements in the queried one or more data sources with the one or more concepts, wherein the one or more data elements archived for a duration exceeding a predetermined time period are tagged as persistent data and the one or more data elements archived for a duration not exceeding the predetermined time period are tagged as dynamic data; and
consolidating, by the semantic integration computing device, the tagged one or more data elements in accordance with the one or more concepts, wherein the one or more data elements tagged as persistent data are associated with the one or more persistent data sources and the one or more data elements tagged as dynamic data are associated with the one or more dynamic data sources.

16. The method as claimed in claim 15, wherein the ontology comprises at least one semantic map, a concept dictionary, or one or more process ontologies, wherein the at least one semantic map, the concept dictionary, or the one or more process ontologies comprise best practices, expert knowledge, or an application of machine learning technique on the one or more data sources.

17. The method as claimed in claim 16, further comprising:
resolving, by the semantic integration computing device, one or more conflicts between the one or more data elements by mapping the one or more data elements to the one or more process ontologies.

18. The method as claimed in claim 15, further comprising:
identifying, by the semantic integration computing device, information goods in response to the one or more data queries, wherein an information good is comprises semantically related set of data elements.

19. The method as claimed in claim 15, wherein the created ontology comprises an index.

20. The method as claimed in claim 15, further comprising:
defining, by the semantic integration computing device, relationships between entities at different levels in the one or more ontology levels.

21. The method as claimed in claim 15, further comprising:
incorporating, by the semantic integration computing device, new standard ontologies into the created ontology to describe the one or more data elements in the one or more data sources.

22. The method as claimed in claim 15, further comprising:
composing, by the semantic integration computing device, one or more sub-queries based on the one or more data queries.

23. The method as claimed in claim 15, further comprising:
organizing, by the semantic integration computing device, the consolidated one or more data elements based on the one or more input commands.

24. The method as claimed in claim 15, wherein the one or more data sources comprises one or more dynamic data sources comprising one or more dynamic data elements generated after a pre-determined time period.

25. The method as claimed in claim 24, further comprising:
ordering, by the semantic integration computing device, the created ontology hierarchically, wherein the higher ontology levels comprise the one or more dynamic data elements.

26. The method as claimed in claim 15, further comprising:
tracking, by the semantic integration computing device, the origin and movement of the one or more data elements in the one or more data sources, wherein the tracked movement of the one or more data elements is a measure of a quantity of tags with which the one or more data sources is associated.

27. The method as claimed in claim 15, wherein the one or more data elements comprises metadata describing the relationships between the tagged one or more data elements.

28. The method as claimed in claim 15, further comprising:
identifying, by the semantic integration computing device, the one or more data sources that are semantically relevant to the one or more data queries; and
retrieving, by the semantic integration computing device, the one or more data elements from the identified one or more data sources.

29. A non-transitory computer readable medium having stored thereon instructions for optimizing the performance of one or more software components at runtime comprising machine executable code which when executed by at least one processor, causes the processor to perform steps comprising:
receiving one or more input commands;
creating an ontology by mapping the one or more input commands to one or more concepts, wherein the created ontology comprises one or more ontology levels, the one or more ontology levels comprising the one or more concepts;
composing one or more data queries based on the one or more input commands;
querying one or more data sources based on the composed one or more data queries, the queried one or more data sources comprising one or more data elements, the queried one or more data sources comprising one or more persistent data sources and one or more dynamic data sources comprising one or more data elements;
tagging the one or more data elements in the queried one or more data sources with the one or more concepts, wherein the one or more data elements archived for a duration exceeding a predetermined time period are tagged as persistent data and the one or more data elements archived for a duration not exceeding the predetermined time period are tagged as dynamic data; and
consolidating the tagged one or more data elements in accordance with the one or more concepts, wherein the one or more data elements tagged as persistent data are associated with the one or more persistent data sources and the one or more data elements tagged as dynamic data are associated with the one or more dynamic data sources.

30. The medium as claimed in claim 29, wherein the ontology comprises at least one semantic map, a concept dictionary, or one or more process ontologies, wherein the at least one semantic map, the concept dictionary, or the one or more process ontologies comprise best practices, expert knowledge, or an application of machine learning technique on the one or more data sources.

31. The medium as claimed in claim 30, further having stored thereon instructions that when executed by the processor cause the processor to perform steps further comprising:
resolving one or more conflicts between the one or more data elements by mapping the one or more data elements to the one or more process ontologies.

32. The medium as claimed in claim 29, further having stored thereon instructions that when executed by the processor cause the processor to perform steps further comprising:
identifying information goods in response to the one or more data queries, wherein an information good is comprises semantically related set of data elements.

33. The medium as claimed in claim 29, wherein the created ontology comprises an index.

34. The medium as claimed in claim 29, further having stored thereon instructions that when executed by the processor cause the processor to perform steps further comprising:
defining relationships between entities at different levels in the one or more ontology levels.

35. The medium as claimed in claim 29, further having stored thereon instructions that when executed by the processor cause the processor to perform steps further comprising:
incorporating new standard ontologies into the created ontology to describe the one or more data elements in the one or more data sources.

36. The medium as claimed in claim 29, further having stored thereon instructions that when executed by the processor cause the processor to perform steps further comprising:
composing one or more sub-queries based on the one or more data queries.

37. The medium as claimed in claim 29, further having stored thereon instructions that when executed by the processor cause the processor to perform steps further comprising:
organizing the consolidated one or more data elements based on the one or more input commands.

38. The medium as claimed in claim 29, wherein the one or more data sources comprises one or more dynamic data sources comprising one or more dynamic data elements generated after a pre-determined time period.

39. The medium as claimed in claim 38, further having stored thereon instructions that when executed by the processor cause the processor to perform steps further comprising:
ordering the created ontology hierarchically, wherein the higher ontology levels comprise the one or more dynamic data elements.

40. The medium as claimed in claim 29, further having stored thereon instructions that when executed by the processor cause the processor to perform steps further comprising:
tracking the origin and movement of the one or more data elements in the one or more data sources, wherein the tracked movement of the one or more data elements is a measure of a quantity of tags with which the one or more data sources is associated.

41. The medium as claimed in claim 29, wherein the one or more data elements comprises metadata describing the relationships between the one or more data elements.

42. The medium as claimed in claim 29, further having stored thereon instructions that when executed by the processor cause the processor to perform steps further comprising:
identifying the one or more data sources that are semantically relevant to the one or more data queries; and retrieving the one or more data elements from the identified one or more data sources.

* * * * *